United States Patent [19]

Ansel et al.

[11] Patent Number: 4,472,021
[45] Date of Patent: Sep. 18, 1984

[54] STRIPPABLE RADIATION-CURED COATINGS FOR OPTICAL FIBER AND METHOD

[75] Inventors: Robert E. Ansel, Hoffman Estates; Orvid R. Cutler, Jr., Rolling Meadows; George I. Pasternack, Lincolnshire, all of Ill.

[73] Assignee: DeSoto, Inc., Des Plaines, Ill.

[21] Appl. No.: 447,181

[22] Filed: Dec. 10, 1982

[51] Int. Cl.$^3$ .................. G02B 5/172; C08F 2/50
[52] U.S. Cl. ...................... 350/96.23; 350/96.3; 204/159.19; 204/159.13; 427/54.1; 428/429; 524/731
[58] Field of Search ............... 350/96.23; 204/159.13; 427/54.1

[56] References Cited
U.S. PATENT DOCUMENTS 4,333,998  6/1982  Leszyk ..................... 204/159.13
4,367,918  1/1983  Pinnow ..................... 427/163

*Primary Examiner*—John C. Bleutge
*Assistant Examiner*—A. H. Koeckert
*Attorney, Agent, or Firm*—Dressler, Goldsmith, Shore, Sutker & Milnamow, Ltd.

[57] ABSTRACT

Radiation-curable coating compositions particularly adapted to reduce the adhesion of the radiation-cured coatings to glass optical fibers (and thereby enhance strippability) are disclosed. These comprise a radiation-curable polyethylenic organic compound and from about 2% to about 20% of the coating composition of an organic polysiloxane carrying a plurality of hydroxy-terminated groups which are joined to some of the silicon atoms in the polysiloxane chain by a carbon-to-silicon bond. The polysiloxane reduces the adhesion of the radiation-cured coating to the glass surface of the fiber. Ultraviolet cures using acrylates as the ethylenic group are preferred.

9 Claims, No Drawings

STRIPPABLE RADIATION-CURED COATINGS FOR OPTICAL FIBER AND METHOD

DESCRIPTION

1. Technical Field

This invention relates to the coating of optical fibers using radiation-curable coating compositions, and more particularly to the provision of ultraviolet curable compositions which can be applied directly to the glass surface of the optical fibers, and which cure to provide low adhesion to the glass surface so as to facilitate mechanical removal of the cured coating.

2. Background Art

Optical glass fibers are acquiring increasing importance for communication purposes, but in order to use the glass fibers it is necessary to protect the glass surface from moisture and abrasion. This is done by coating the glass fiber immediately following its formation. Solvent solution coatings and extrusions have been applied, but these present problems which have been solved to a considerable extent by the employment of ultraviolet light-curable coating compositions.

One problem presented by the use of coatings which are adhered to the glass surface of the optical fiber is caused by the difficulty of mechanically removing the adhered coating where this is required, as for splicing fiber ends together in a connector of one sort or another. Thus, and regardless of whether one intends to protect the glass surface with a single coating or with a plurality of superposed coatings, it is desirable to modify the coating in contact with the glass surface to reduce adhesion while retaining adherent contact in order to facilitate mechanical stripping of the coating while minimizing abrasion of the glass.

The minimize microbending, the coatings in contact with the glass surface are selected to possess a very low modulus, and ultraviolet curable coating compositions have been developed which possess low modulus combined with reasonable hardness and strength. These are more fully described in certain commonly owned applications, namely: the application of Robert E. Ansel Ser. No. 170,148 filed July 18, 1980, and the application of Robert E. Ansel, O. Ray Cutler and Elias P. Moscovis Ser. No. 398,161 filed July 19, 1982. These very low modulus coatings are preferably topcoated, but harder and stronger coatings which do not require topcoating to provide preferred properties have also been developed and are the subject of a copending application.

DISCLOSURE OF INVENTION

In accordance with this invention, a radiation-curable coating composition comprising a radiation-curable polyethylenic organic compound is modified to include from about 2% to about 20% of the coating composition of an organic polysiloxane carrying a plurality of hydroxy-terminated groups which are joined to some of the silicon atoms in the polysiloxane chain by a carbon-to-silicon bond. These hydroxy-terminated groups are desirably carbinol groups so that the polysiloxane can be designated as a polycarbinol polysiloxane having from 1 to 6 carbinol groups, and the carbinol groups preferably include up to 15 ether groups.

The preferred polysiloxanes may be copolymers or graft copolymers, and thus may possess either of structures (1) or (2):

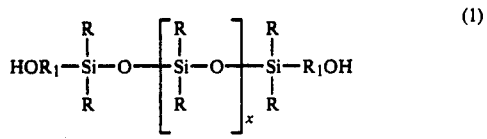

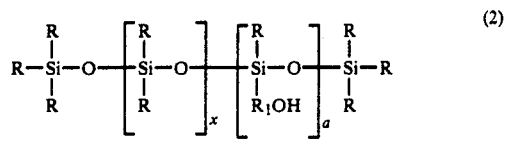

where

R is a hydrocarbon radical having from 1 to 12 carbon atoms;

$R^1$ is an alkylene group having 1 to 16 carbon atoms, such as butylene or propylene, or a polyether having alkylene groups with 2 to 4 carbon atoms and up to 15 ehter groups, such as polyoxypropylene groups having about 6 ether groups;

x has a value of 1 to 1000, such as 50 or 100; and a has a value of from 2 to 6, preferably 3.

In the above formulas, R is preferably methyl, but it may also be ethyl or butyl or even phenyl or toluyl.

Polysiloxane polycarbinols of the type described above are known. They are disclosed, for example, in U.S. Pat. No. 4,331,704, and they are available in commerce from Dow Corning. A preferred Dow Corning product for use herein is available under the trade designation DC 193. It is preferred to employ the polysiloxane in an amount of from 3% to 15% of the coating composition.

In this specification and the accompanying claims, all proportions are by weight, unless otherwise specified, and acrylates will be used as illustrative.

It is desired to point out that silicone oils are commonly incorporated into coating compositions, and these tend to bloom to the surface as the coating is cured, especially when heat is used to enable the cure to be carried out. The result of the conventional effort is to provide a coating with a slick or lubricated suface, without impairing adhesion.

This invention normally has an opposite purpose, namely: to reduce adhesion to the substrate, and, where topcoating is contemplated, to reduce adhesion to the substrate without greatly increasing the surface lubricity.

Accordingly, this invention is limited to the use of a radiation cure of a radiation-curable composition containing a minimum proportion of appropriate polysiloxane, and to coatings on glass, for other substrates do not respond to this invention. Indeed, when the appropriate polysiloxanes are used on other surfaces and/or in smaller amounts than required herein, the normal result on baking or radiation cure is an adherent coating with a lubricated surface.

Thus, and for lubricating purposes, one would normally use less than about 1% of a polysiloxane, so if the polysiloxanes used herein were employed, they would likely be used in smaller amounts than are needed for the purposes of this invention. Also, the concept of a strippable adherent coating on a glass surface is of prime significance with respect to a coating which contacts the glass surface of an optical fiber. There must possess a relatively low modulus below about 150,000 psi, preferably below 15,000 psi. Thus, the polysiloxane selection and proportions have special significance in a radiation-curable coating which cures to form a coating having a relatively low modulus of the character defined.

Radiation-curable coatings for optical glass fiber may be of various types, but it is always necessary, in order to provide the low to moderate modulus which is necessary in a coating which will contact the glass, to employ a polyethylenic organic compound. Many appropriate polyethylenic organic compounds which may be used are known, but it has been difficult to achieve preferred properties. Very low modulus coatings which are usually overcoated are described in the application of Ansel Ser. No. 170,148 referred to previously. These can be described as ethylenic-terminated polyurethane, polyamide or polyurea oligomers having a molecular weight in the range of about 200 to about 8000 and containing one amide, urea or urethane group for every 300 to 900 units of molecular weight, and containing polyalkylene polyether, polyalkylene polythiol or polyalkylene polyester in which the alkylene moiety contains 2 to 6 carbon atoms. These diacrylate polyurethane-ureas are combined with 20% to 50% of the composition of a radiation-curable monoethylenic monomer having a $T_g$ below about $-10°$ C., such as phenoxyethyl acrylate, and with 2% to 20% of a monoethylenic monomer having a strong capacity for hydrogen bonding, such as N-vinyl pyrrolidone.

An illustrative coating of the above type is made by reacting 4 moles of 4,4'-methylene bis(cyclohexyl isocyanate) with 2 moles of polyoxypropylene glycol of molecular weight 1000 and then reacting with 2 moles of 2-hydroxyethyl acrylate and then with one mole of polyoxypropylene diamine of molecular weight 230 in the presence of 3.4 moles of N-vinyl pyrrolidone and 9.7 moles of phenoxyethyl acrylate. This mixture, with 3% of diethoxy acetophenone as photoinitiator, can be ultraviolet-cured on freshly drawn optical fiber, and it can be modified to reduce adhesion to the glass in accordance with this invention.

Another type of very low modulus coating which is usually overcoated is described in Ansel et al Ser. No. 398,161 filed July 19, 1982, also referred to previously. These coatings can be described as consisting essentially of an organic polysiloxane having from 2 to 6 reactive side chains each of which carry a functional group providing one reactive site which has been reacted to provide a single radiation-curable monoethylenically unsaturated side chain. There is about one such side chain for every 500 to 5000 units of molecular weight. This preferably provides a prime coating which has a modulus at room temperature and at $-60°$ C. which is below 3000.

These coatings can be illustrated by reacting one mole of 2-hydroxyethyl acrylate with one mole of isophorone diisocyanate to produce an acrylate-functional urethane monoisocyanate and then reacting three moles of this reaction product with one mole of tris(2-hydroxy polyoxypropyl) polysiloxane of average molecular weight and equivalent weight 2000 (80% methyl substituted and 20% polyoxypropyl substituted). Upon the addition of 3% of diethoxy acetophenone photoinitiator, the mixture can be ultraviolet-cured on freshly drawn optical fiber, and it can be modified to reduce adhesion to the glass in accordance with this invention.

Moderate modulus coatings which are useful without topcoating can be provided by combining: (1) from 65% to 85% of a diethylenic-terminated polyurethane, which may contain urea groups, this polyurethane being based on a diisocyanate having an average molecular weight of from 400 to 5000: and (2) from 5% to 25% of a radiation-curable monoethylenically unsaturated liquid monomer have a $T_g$ below about $-20°$ C. These are illustrated by an adduct of two moles of 2-hydroxyethyl acrylate with one mole of a diisocyanate-terminated polyurethane made by adducting toluene diisocyanate with a polytetramethylene glycol formed by polymerizing tetrahydrofuran to a molecular weight of 600–800. The polyurethane formed by acrylating this diisocyanate has a molecular weight of about 1900. 75.4 parts of this product mixed with 2.5 parts of benzophenone, 0.4 parts of benzil dimethyl ketal photoinitiator, 9 parts of trimethylol propane triacrylate and 12.4 parts of ethoxy ethoxyethyl acrylate provides a coating composition which can be coated upon optical glass fiber and ultraviolet cured to provide an effective single-coated product. This coating composition can also be modified to reduce adhesion to the glass in accordance with this invention.

The $T_g$ of a monomer is the glass transition temperature of a homopolymer of the monomer.

Since ultraviolet light is preferred, acrylic unsaturation is best, but since the radiation can vary, electron beam radiation is also useful, so can the character of the unsaturation. Other useful ethylenic unsaturations are illustrated by methacrylic, itaconic, crotonic, allylic, vinylic, etc. These can be provided (using methacrylic unsaturation as illustrative) by reaction of isocyanate functionality with 2-hydroxyethyl methacrylate. Allylic unsaturation may be introduced using allyl alcohol in place of 2-hydroxyethyl acrylate. Vinylic unsaturation may be introduced using hydroxy butyl vinyl ether in place of 2-hydroxyethyl acrylate.

Accordingly, while acrylate unsaturation has been referred to previously as illustrative and preferred, other radiation curable monoethylenically unsaturated groups may be used in its place in the manner illustrated for methacrylic unsaturation. Of course, stronger radiation is needed for these other types of unsaturation, as is well known, and such other radiation is illustrated by electron beam radiation.

The radiation which effects cure will vary with the photoinitiator used. Even visible light may be employed using appropriate photoinitiators. These are illustrated by camphor quinone and coumarin which are used together with a tertiary amine, such as triethyl amine. Diphenylbenzoylphosphine oxide is useful in and near the ultraviolet range.

When ultraviolet light is employed, the coating composition preferably contains a photoinitiator which is usually a ketonic photoinitiator, such as about 3% of diethoxy acetophenone. Other photoinitiators are also known, such as acetophenone, benzophenone, m-chloro-acetophenone, propiophenone, thioxanthone, benzoin, benzil, anthraquinone, and the like. The photoinitiators may be used singly or in mixtures, and are present in an amount up to about 10% of the coating (usually 1–5%). Various amines may also be added, like diethyl amine, but are not needed in many instances.

The coatings of this invention are applied to freshly drawn optical fibers which are then exposed to appropriate radiation, preferably ultraviolet light, to cure the same. As a result of the inclusion of the polysiloxane polycarbinols in large amount, it is found that the coatings continue to cure well to provide about the same physical characteristics that they possessed when the polysiloxane was not present, that the coatings remain adherent to the glass, and that they are much more easily stripped away from the glass by cutting the coating near an end of the coated fiber and then simply pulling the coating off the end of the fiber.

The invention is illustrated by a series of coating compositions formulated by simple mixing of the components tabulated below. The mixture is warmed to about 55° C. for 1 hour to dissolve all of the components.

TABLE 1

| Component | Ex. 1 | Ex. 2 | Ex. 3 |
|---|---|---|---|
| 1 | 71.0 | 55.0 | 55.7 |
| 2 | 10.1 | — | — |
| 3 | 7.0 | — | — |
| 4 | 2.6 | 2.1 | 2.6 |
| 5 | 0.01 | 0.01 | 0.01 |
| 6 | 0.9 | 0.6 | 1.7 |
| 7 | 0.1 | — | — |
| 8 | 0.2 | — | — |
| 9 | 5.0 | 5.0 | 10.0 |
| 10 | 1.5 | — | — |
| 11 | 1.0 | — | — |
| 12 | — | 12.7 | 8.6 |
| 13 | — | 24.5 | 21.4 |

In the above tabulation, component 1 is a diacrylate urethane. In Example 1, the diacrylate urethane is an adduct of two moles of 2-hydroxyethyl acrylate with one mole of a diisocyanate-terminated polyurethane made by adducting a mixture of toluene diisocyanates (80% 2,4-isomer and 20% 2,6-isomer) with a polytetramethylene glycol formed by polymerizing tetrahydrofuran to form a polyether diol having a molecular weight of 600–800. The polyurethane formed by acrylating this diisocyanate has a molecular weight of about 1900 and includes an average of 5–6 urethane groups per molecule. The du Pont product Adiprene L-200 may be used. In Example 2, the diacrylate urethane is the reaction product of 17.8% of toluene diisocyanate, 6% of 2-hydroxyethylacrylate, 0.1% of dibutyl tin dilaurate, 76% of polyoxypropylene glycol (molecular weight=1025), and 0.01% of phenothiazine. In Example 3, the diacrylate urethane is the reaction product of an adduct of two moles of 2-hydroxyethyl acrylate with one mole of a diisocyanate-terminated polyurethane made by adducting a mixture of toluene diisocyanates (80% 2,4-isomer and 20% 2,6-isomer) with a polytetramethylene glycol formed by polymerizing tetrahydrofuran to form a polyether diol having a molecular weight of 800–1200. The polyurethane formed by acrylating this diisocyanate has a molecular weight of about 2500 and has an isocyanate functionality of 6.3%. The du Pont product Adiprene L-167 may be used. 76 parts of the above adduct are mixed with 6.5 parts of 2-hydroxy ethyl acrylate, 0.1 parts of dibutyl tin dilaurate, and 17.3 parts of polytetramethylene glycol having a molecular weight of 650 (the du Pont product Teracol 650 may be used).

Component 2 is trimethylol propane triacrylate.
Component 3 is 2-ethylhexyl acrylate.
Component 4 is benzophenone, a photoinitiator.
Component 5 is a phenothiazine.
Component 6 is diethyl amine.
Component 7 is a dimethyl polysiloxane polycarbinol graft polymer. The Dow Corning product DC-57 may be used.

Component 8 is a dimethyl polysiloxane polycarbinol graft polymer. The Dow Corning product DC-190 may be used.

Component 9 is a dimethyl polysiloxane polycarbinol graft polymer, as previously described. The Dow Corning product DC-193 may be used.

Component 10 is a high molecular weight ester wax. Mold Wiz INT-EQ-6/10 of Axel Corporation may be used.

Component 11 is benzil dimethyl ketal which serves as a photoinitiator. Irgacure 651 of Ciba-Geigy may be used as component 11.

Component 12 is N-vinyl pyrrolidine.
Component 13 is phenoxyethyl acrylate.

By applying the coatings tabulated previously to freshly drawn glass fiber in a thickness of 125 microns (the fiber diameter was about 125 microns) and then passing the wet-coated fiber through two tandemly arranged 10 inch medium pressure mercury vapor lamps (300 watts) at a velocity of 1.5 meters per second, the following results are obtained.

TABLE 2

| Property | Ex. 1 | Ex. 2 | Ex. 3 |
|---|---|---|---|
| Viscosity at application (cps. at 25° C.) | 12,000 | 3,000 | 6,000 |
| Tensile strength (psi) | 1,000 | 250 | 200 |
| % Elongation | 40 | 210 | 100 |
| Modulus at 2.5% elongation/ (psi) | 4,000 | 350 | 300 |
| Rupture strength (in. lb./in.$^3$) | 500 | 200 | 400 |
| Hardness Shore A | 68 | 44 | 35 |
| $T_g$ (°C.) | −47 | −40 | −38 |
| Coefficient of thermal expansion (below $T_g$) [x 10$^{-5}$] | 7 | 6 | 6 |

When the coatings on the cured coated glass fibers are cut close to a fiber end, the coating can be easily pulled off the fiber end with minimal marring of the glass surface. Marring abrades the glass and interferes with the transmission of light through the fiber.

The properties listed in Table 2 were obtained using a 3 mil thick cast film rather than the coating on the optical fiber because this is a more practical way to make the measurements.

What is claimed is:

1. An optical glass fiber coated with a radiation-cured coating of radiation-curable polyethylenic organic compound providing a cured coating having a modulus less than about 150,000 psi. and from about 2% to about 20% of the coating of an organic polysiloxane carrying a plurality of hydroxy-terminated groups which are joined to some of the silicon atoms in the polysiloxane chain by a carbon-to-silicon bond, said polysiloxane reducing the adhesion of the radiation-cured coating to the glass surface of said optical fiber.

2. An optical fiber as recited in claim 1 in which said polysiloxane is present in an amount of from 3% to 15% of the coating composition.

3. An optical fiber as recited in claim 1 in which said polysiloxane carried from 2 to 6 carbinol groups.

4. An optical fiber as recited in claim 3 in which each of said carbinol groups is a polyether including up to 15 ether groups.

5. An optical fiber as recited in claim 3 in which said polysiloxane is methyl-substituted except for said carbinol groups.

6. An optical fiber as recited in claim 1 in which said polysiloxane possesses either of the following structures:

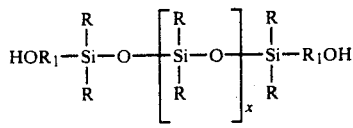
(1)

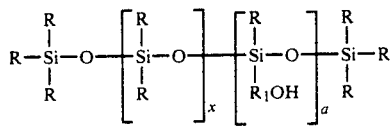
(2)

where

R is a hydrocarbon radical having from 1 to 12 carbon atoms;

$R_1$ is an alkylene group having from 1 to 16 carbon atoms, or a polyether having alkylene groups having 2 to 4 carbon atoms and up to 15 ether groups;

x has a value of 1 to 1000; and a has a value of from 2 to 6.

7. An optical fiber as recited in claim 6 in which R is methyl.

8. An optical fiber as recited in claim 8 in which said modulus is less than about 15,000 psi.

9. A method of producing a coated optical fiber in which the coating exhibits reduced adhesion to the glass surface of the fiber comprising, coating the glass surface of said optical fiber with a coating of liquid radiation-curable coating composition comprising radiation-curable polyethylenic organic compound providing a cured coating having a modulus less than about 150,000 psi. and from about 2% to about 20% of the coating composition of an organic polysiloxane carrying a plurality of hydroxy-terminated groups which are joined to some of the silicon atoms in the polysiloxane chain by a carbon-to-silicon bond, said polysiloxane reducing the adhesion of the radiation-cured coating to the glass surface of said optical fiber, and then exposing the wet-coated fiber to radiation to cure the same.

* * * * *

UNITED STATES PATENT AND TRADEMARK OFFICE
CERTIFICATE OF CORRECTION

PATENT NO. : 4,472,021
DATED : September 18, 1984
INVENTOR(S) : Robert E. Ansel et al.

It is certified that error appears in the above—identified patent and that said Letters Patent is hereby corrected as shown below:

In the heading, change the inventor's name "George I. Pasternack" to read: -- George Pasternack --

Column 2, line 17, "$R^1$" should read: -- $R_1$ --

Column 3, line 17, "200" should read: -- 2000 --

Column 8, line 10, "claim 8" should read: -- claim 1 --

Signed and Sealed this

Twelfth Day of February 1985

[SEAL]

Attest:

DONALD J. QUIGG

Attesting Officer     Acting Commissioner of Patents and Trademarks